(12) United States Patent
Son et al.

(10) Patent No.: US 12,459,439 B2
(45) Date of Patent: Nov. 4, 2025

(54) SLIDING TRANSPORT APPARATUS OF STORAGE PORTION FOR VEHICLE

(71) Applicant: KBI DONGKOOK IND. CO., LTD., Seoul (KR)

(72) Inventors: Dong Il Son, Ulsan (KR); Dong Yong Choi, Gyeonggi-do (KR); Chang Bok Park, Ulsan (KR); Sun Kyung Kim, Ulsan (KR); O Sim Kwon, Ulsan (KR)

(73) Assignee: KBI Dongkook IND., LTD., Seoul (KR)

( * ) Notice: Subject to any disclaimer, the term of this patent is extended or adjusted under 35 U.S.C. 154(b) by 220 days.

(21) Appl. No.: 18/325,398

(22) Filed: May 30, 2023

(65) Prior Publication Data

US 2023/0356663 A1    Nov. 9, 2023

Related U.S. Application Data

(63) Continuation of application No. PCT/KR2022/012472, filed on Aug. 22, 2022.

(30) Foreign Application Priority Data

May 4, 2022    (KR) .................. 10-2022-0055385

(51) Int. Cl.
  *B60R 7/04*    (2006.01)
  *B60R 11/00*   (2006.01)

(52) U.S. Cl.
  CPC ......... *B60R 7/04* (2013.01); *B60R 2011/0084* (2013.01)

(58) Field of Classification Search
  CPC ..... B60R 7/04; B60R 7/06; B60R 2011/0084; F16C 29/005; A47B 88/487

(Continued)

(56) References Cited

U.S. PATENT DOCUMENTS

| | | | | |
|---|---|---|---|---|
| 5,046,861 A | * | 9/1991 | Tarver | A47B 88/42 384/23 |
| 6,135,529 A | * | 10/2000 | De Angelis | B60R 7/04 224/281 |

(Continued)

FOREIGN PATENT DOCUMENTS

| | | |
|---|---|---|
| CN | 210033237 Y | 2/2020 |
| JP | 10-329612 A | 12/1998 |

(Continued)

OTHER PUBLICATIONS

International Search Report for corresponding International Application No. PCT/KR2022/015294 mailed Jan. 16, 2023.

(Continued)

*Primary Examiner* — Justin M Larson
(74) *Attorney, Agent, or Firm* — Eschweiler & Potashnik, LLC

(57) ABSTRACT

Sliding transport apparatus of a storage portion for a vehicle. The sliding transport apparatus includes a fixed frame provided such that the fixed frame is stationary in a vehicle interior space, a movable frame disposed on an upper portion of the fixed frame and configured to be movable along a longitudinal direction of the fixed frame, the movable frame having an upper portion on which the storage portion is mounted, and a stopper provided detachably on the fixed frame, the stopper being inserted into a guide long hole formed in the movable frame, thereby limiting a movement distance of the movable frame.

6 Claims, 7 Drawing Sheets

(58) Field of Classification Search
USPC ............ 224/281, 554; 296/37.12, 37.8, 37.1,
296/24.34; 248/429; 384/7, 21
See application file for complete search history.

(56) References Cited

U.S. PATENT DOCUMENTS

| | | | |
|---|---|---|---|
| 6,305,739 B1 * | 10/2001 | Corona | B60P 3/34 296/165 |
| 6,382,480 B1 * | 5/2002 | Egly | B60R 5/00 224/310 |
| 6,655,561 B2 * | 12/2003 | Panhelleux | B60N 2/793 224/281 |
| 7,066,521 B2 * | 6/2006 | Jung | B60N 2/0705 296/65.13 |
| 7,077,468 B2 * | 7/2006 | Maierholzner | B60N 2/773 220/348 |
| 7,234,747 B2 * | 6/2007 | Rasmussen | B60P 3/34 296/165 |
| 7,591,498 B2 * | 9/2009 | Busha | B60N 3/101 224/281 |
| 8,235,442 B2 * | 8/2012 | Spitler | B60R 7/04 296/37.8 |
| 8,267,581 B2 * | 9/2012 | Li | G06F 1/1624 384/7 |
| 8,534,733 B2 * | 9/2013 | Schreurs | B60N 2/02 296/1.09 |
| 8,585,150 B2 * | 11/2013 | Von Rothkirch und Panthen et al. | F16C 29/123 297/411.21 |
| 9,145,070 B2 | 9/2015 | Hayashi | |
| 9,657,772 B2 * | 5/2017 | Bozio | F16C 29/02 |
| 9,776,539 B2 * | 10/2017 | Lee | B60N 2/773 |
| 11,667,243 B2 * | 6/2023 | Son | B60R 7/06 296/37.12 |
| 11,958,440 B2 * | 4/2024 | Chen | B60R 7/04 |
| 2010/0008606 A1 * | 1/2010 | Craddock | B60N 2/773 384/26 |
| 2015/0258923 A1 * | 9/2015 | Skapof | B60R 7/04 296/24.34 |
| 2023/0084592 A1 * | 3/2023 | Son | B60R 7/04 296/24.34 |
| 2023/0311777 A1 * | 10/2023 | Son | B60R 7/04 296/24.3 |
| 2023/0356663 A1 * | 11/2023 | Son | B60R 7/04 |

FOREIGN PATENT DOCUMENTS

| | | |
|---|---|---|
| JP | 2000-264132 A | 9/2000 |
| JP | 2009-006737 A | 1/2009 |
| JP | 2012-126183 A | 7/2012 |
| JP | 2018-090053 A | 6/2018 |
| KR | 20-1998-0064592 A | 11/1998 |
| KR | 10-2005-0045430 A | 5/2005 |
| KR | 10-2010-0105923 A | 10/2010 |
| KR | 10-2019-0053448 A | 5/2019 |

OTHER PUBLICATIONS

Korean Office Action dated Aug. 19, 2024 for corresponding Korean Application No. 10-2024-0098703 and English translation.
Korean Office Action dated Aug. 19, 2024 for corresponding Korean Application No. 10-2024-0098704 and English translation.
Office Action dated Nov. 29, 2023 for corresponding Korean Application No. 10-2022-0055385 and English translation.

* cited by examiner

[FIG. 1]
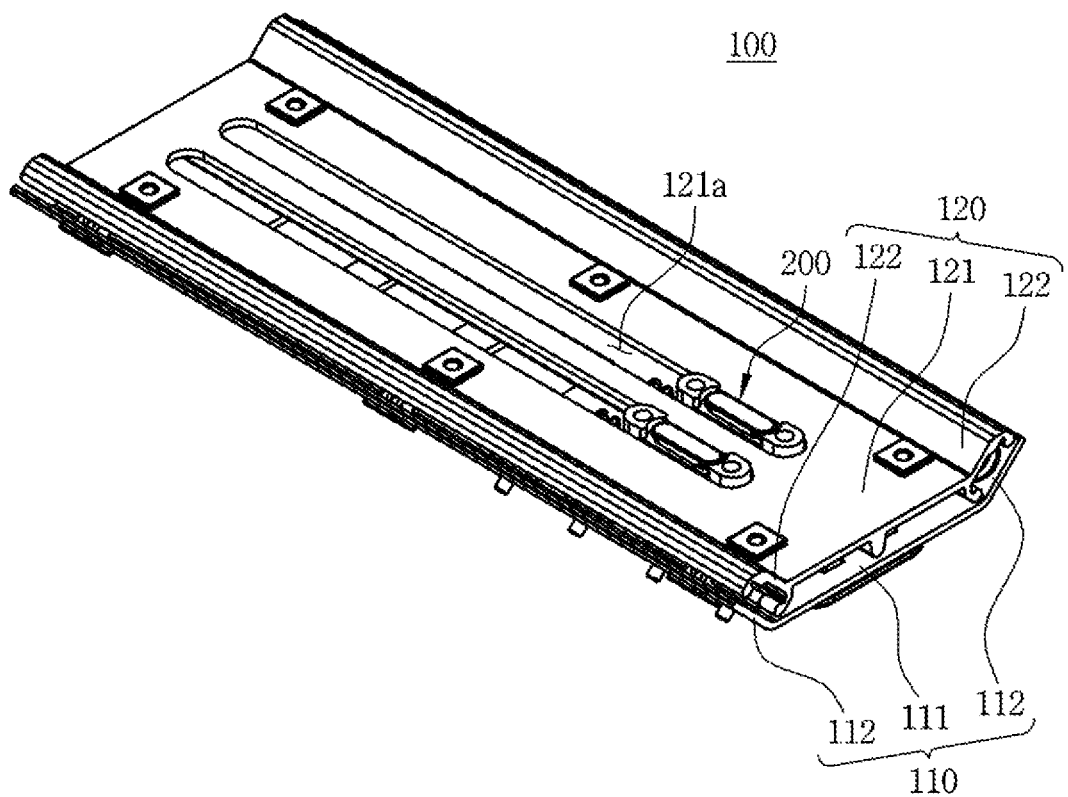

[FIG. 2]
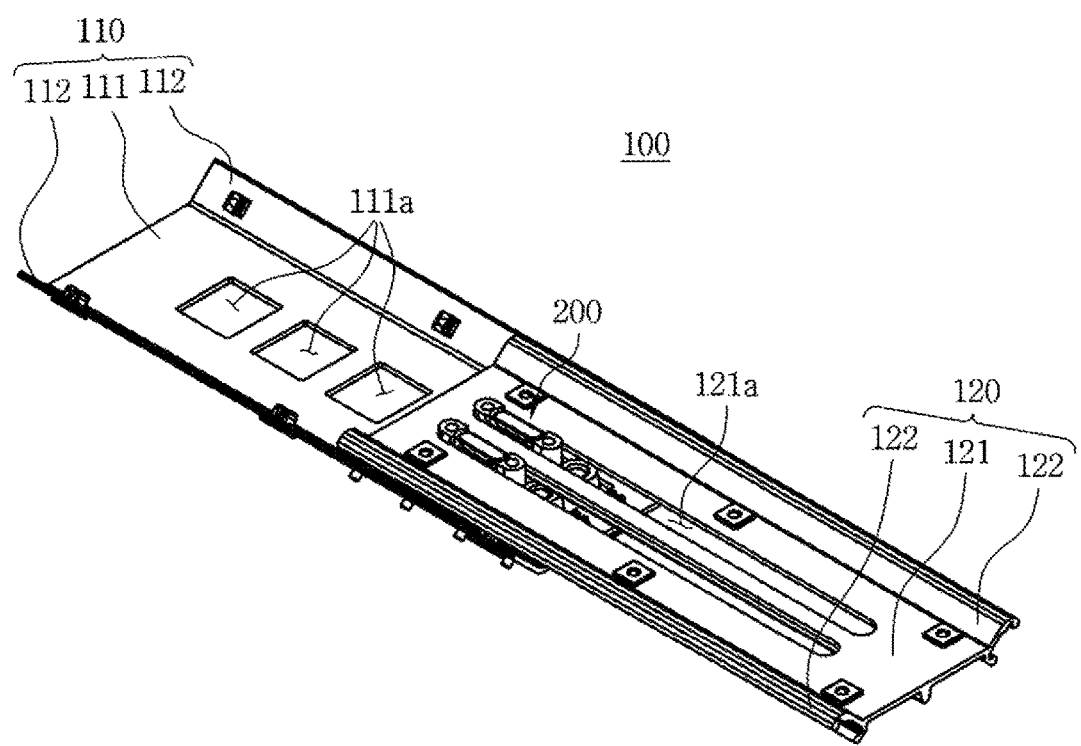

[FIG. 3]
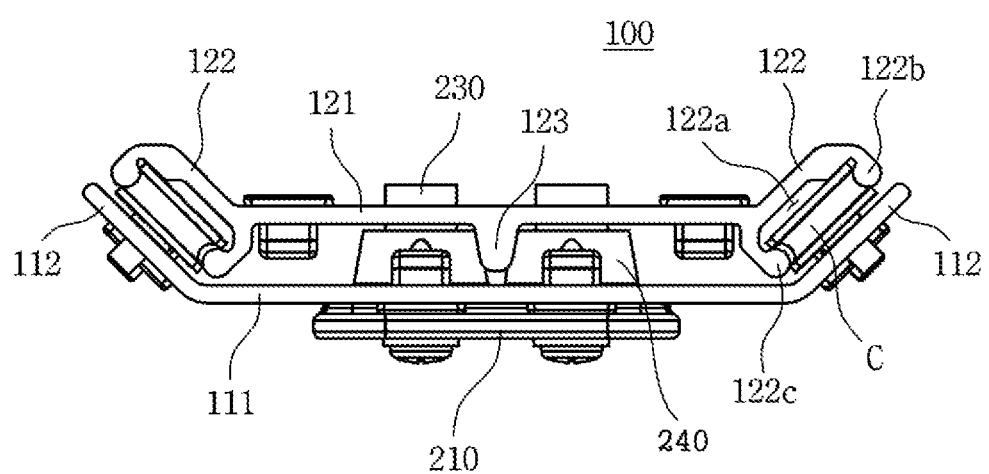

[FIG. 4]
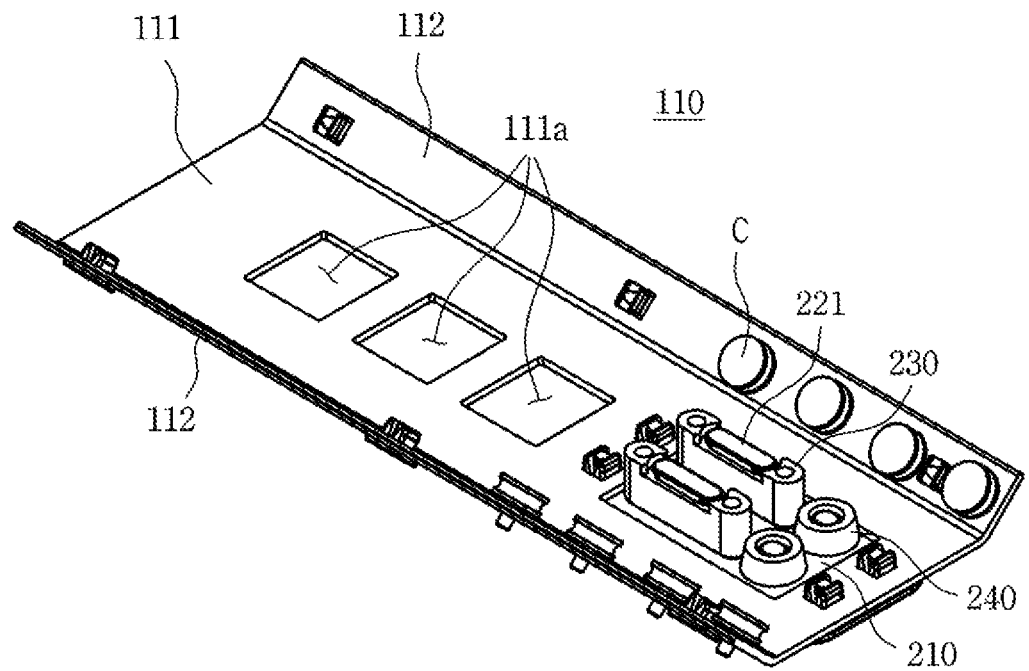

[FIG. 5]
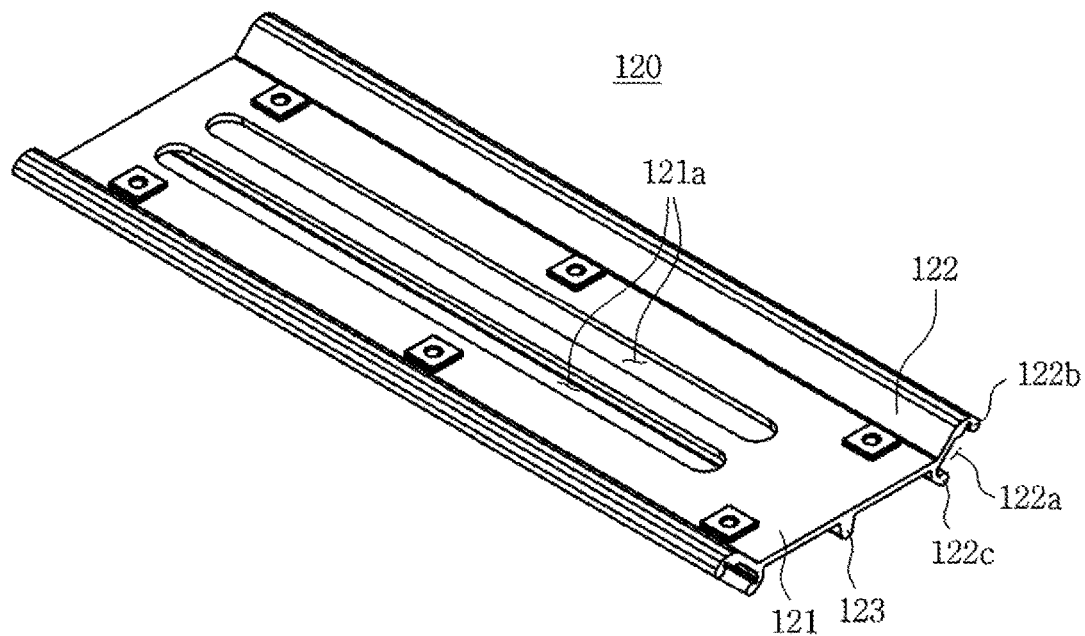

[FIG. 6]
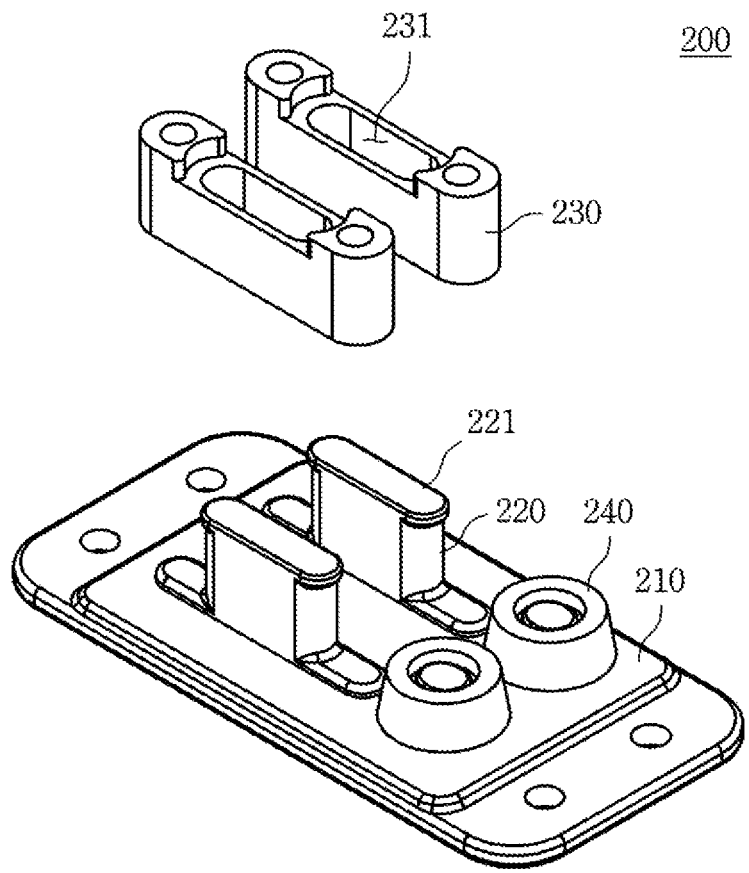

[FIG. 7]
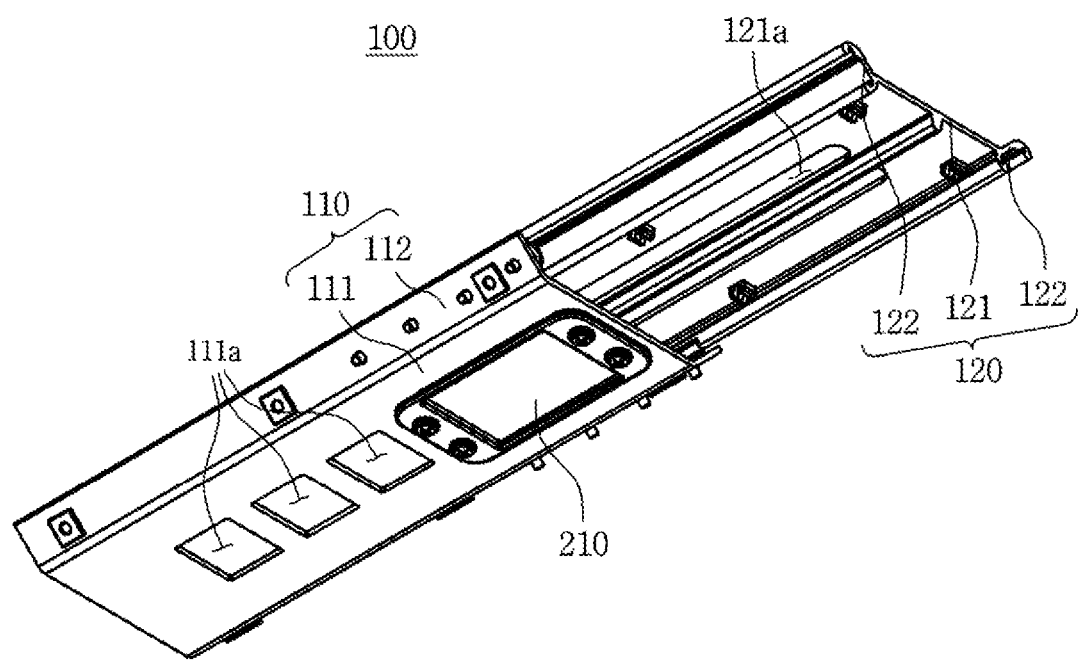

SLIDING TRANSPORT APPARATUS OF STORAGE PORTION FOR VEHICLE

TECHNICAL FIELD

The present disclosure relates to a sliding transport apparatus for a storage portion of vehicles. More particularly, the present disclosure relates to a sliding transport apparatus for a storage portion of vehicles, the sliding transport apparatus being applied in a glove box, a console box, or a withdrawal tray provided inside the vehicle and being configured such that the storage portion or the tray can be stably and slidably transported by a user.

BACKGROUND

Generally, a console box, a glove box, an overhead box, and so on for storing items are provided in an interior of a vehicle.

In a storage space formed by such boxes, items used in the interior of the vehicle are stored, and the boxes are mounted such that the boxes are capable of being opened and closed for the convenience of a user. For example, the glove box is mounted on a dashboard disposed in the front of a passenger seat of the vehicle such that the glove box is capable of being opened and closed, and the console box is mounted between a driver seat and the passenger seat such that the console box is capable of being opened and closed.

As a recent trend for a vehicle to be equipped with an autonomous driving system, utilization of an interior space of a vehicle is becoming important. In addition, since a battery pack using electric energy or hydrogen energy is used as a driving power source instead of an existing internal combustion engine, an interior space of a vehicle is expanded as the number of internal components of the vehicle decreases.

Therefore, a method of expanding a space in which items can be stored by changing a glove box or a console box in a hinged type to a glove box or a console box in a sliding type is researched, and a method of changing a position of a seat so that a driver or a passenger can perform various activities other than driving in an interior of a vehicle is being researched.

Particularly, a conventional console box provided in the vehicle is disposed between a driver seat and a passenger seat while being in a state in which the console box is fixed and mounted at a vehicle body, and has an important role in forming a space at a front seat side. Therefore, as a range of autonomous driving expands, it is required to increase space utilization by configuring a console box to be movable. Particularly, research and development of an operation mechanism for a user to easily and quickly move a console box in a vehicle interior space is required.

However, in slidably moving a glove box or a console box in a rectilinear direction during driving of a vehicle, a situation in which a storage portion is moved in a height direction (up and down directions) or a width direction (left and right directions) occurs, and there is a problem that noise is caused accordingly.

Accordingly, the present applicant has proposed the present disclosure in order to solve the problem as described above, and Korean Patent Application Publication No. 10-2005-0045430 'CONSOLE BOX OF AUTOMOBILE' as related conventional technology literature has been disclosed.

BRIEF SUMMARY

Accordingly, the present disclosure has been made keeping in mind the above problems occurring in the related art, and an objective of the present disclosure is to provide a sliding transport apparatus of a storage portion for a vehicle, the sliding transport apparatus being configured to prevent up and down direction movements or left and right direction movements of the storage portion and to stably and easily transport the storage portion when a user slidably opens or closes the storage portion that is provided in a vehicle interior space.

In order to achieve the above objective, according to the present disclosure, there is provided a sliding transport apparatus of a storage portion for a vehicle, the sliding transport apparatus including: a fixed frame provided such that the fixed frame is stationary in a vehicle interior space; a movable frame disposed on an upper portion of the fixed frame and configured to be movable along a longitudinal direction of the fixed frame, the movable frame having an upper portion on which the storage portion is mounted; and a stopper provided detachably on the fixed frame, the stopper being inserted into a guide long hole formed in the movable frame, thereby limiting a movement distance of the movable frame.

In addition, the fixed frame may include: a floor member provided such that the floor member is stationary in the vehicle interior space; and a first inclined member that protrudes in a direction inclined upwardly from opposite sides in a width direction of the floor member, the first inclined member on which a plurality of rail casters configured to move the movable frame is rotatably mounted.

In addition, the movable frame may include: an upper plate member on which the storage portion is mounted and in which the guide long hole is formed; and a second inclined member that protrudes in a direction inclined upwardly from opposite sides in a width direction of the upper plate member while having an inclination angle equal to an inclination angle of the first inclined member, the second inclined member having a rail groove in which the plurality of rail casters is accommodated.

In addition, the plurality of rail casters may be rotatably mounted on the first inclined member while having an inclination angle equal to an inclination angle of the first inclined member.

In addition, the stopper may include: a plate mounted on a bottom surface of the floor member; an insertion member that protrudes upward from an upper surface of the plate, the insertion member being inserted into the guide long hole; and a buffer member having a through-hole into which the insertion member is capable of being inserted, the buffer member surrounding a circumferential portion of the insertion member.

In addition, the movable frame may include a guide member that protrudes vertically downward from a center of a bottom portion of the upper plate member, and a guide roller in rolling contact with the guide member may be rotatably provided on the plate of the stopper with the guide member interposed therebetween.

In addition, a plurality of opening portions disposed so as to be spaced apart from each other by a predetermined distance may be formed in the floor member along a longitudinal direction of the floor member, and the plate of the stopper may be provided on the floor member while blocking any one of the plurality of opening portions among the plurality of opening portions.

In the sliding transport apparatus of the storage portion for the vehicle according to the present disclosure, since a configuration in which the storage portion provided in the interior space of the vehicle is slidably moved and opened is provided, a space in which items can be stored may be increased, and space utilization may be increased as the interior space of the vehicle is expanded.

In addition, in the sliding transport apparatus of the storage portion for the vehicle according to the present disclosure, the sliding movement distance of the movable frame may be optionally set in consideration of a size of the interior space of the vehicle, a volume of the storage portion, and so on.

In addition, in the sliding transport apparatus of the storage portion for the vehicle according to the present disclosure, a shock that occurs on the movable frame during a process in which the storage portion is slidably moved and stopped may be relieved.

In addition, in the sliding transport apparatus of the storage portion for the vehicle according to the present disclosure, since a configuration preventing a situation in which the movable frame is moved in the up and down directions or the left and right directions is provided, a situation in which the storage portion is unintentionally shaken during the driving process of the vehicle or during a user's operation may be prevented.

BRIEF DESCRIPTION OF DRAWINGS

FIG. 1 is a perspective view illustrating a sliding transport apparatus of a storage portion for a vehicle according to an embodiment of the present disclosure.

FIG. 2 is a perspective view illustrating a state in which a movable frame illustrated in FIG. 1 is slidably moved forward.

FIG. 3 is a front view illustrating the sliding transport apparatus of the storage portion for the vehicle illustrated in FIG. 1.

FIG. 4 is a perspective view illustrating a configuration of a fixed frame according to an embodiment of the present disclosure.

FIG. 5 is a perspective view illustrating a configuration of the movable frame according to an embodiment of the present disclosure.

FIG. 6 is an exploded perspective view illustrating a configuration of a stopper according to an embodiment of the present disclosure.

FIG. 7 is a perspective view illustrating a bottom portion of the sliding transport apparatus illustrated in FIG. 2.

DETAILED DESCRIPTION

Advantages and features of the present disclosure, and methods of achieving the same will become apparent with reference to the embodiments described below in detail in conjunction with the accompanying drawings.

However, the present disclosure is not limited to the embodiments disclosed below, but may be implemented in various different forms. The present embodiments are intended to complete the disclosure of the present disclosure and provided to fully inform the skilled in the art to which the disclosure pertains of the scope of the disclosure. The disclosure is defined only by the scope of the claims.

Hereinafter, a sliding transport apparatus of a storage portion for a vehicle according to an embodiment of the present disclosure will be described in detail with reference to FIGS. 1 to 7. In a description of the present disclosure, a detailed description of related known functions or configurations will be omitted to avoid making the essence of the present disclosure unclear.

FIG. 1 is a perspective view illustrating a sliding transport apparatus of a storage portion for a vehicle according to an embodiment of the present disclosure, FIG. 2 is a perspective view illustrating a state in which a movable frame illustrated in FIG. 1 is slidably moved forward, FIG. 3 is a front view illustrating the sliding transport apparatus of the storage portion for the vehicle illustrated in FIG. 1, FIG. 4 is a perspective view illustrating a configuration of a fixed frame according to an embodiment of the present disclosure, FIG. 5 is a perspective view illustrating a configuration of the movable frame according to an embodiment of the present disclosure, FIG. 6 is an exploded perspective view illustrating a configuration of a stopper according to an embodiment of the present disclosure, and FIG. 7 is a perspective view illustrating the bottom portion of the sliding transport apparatus illustrated in FIG. 2.

As illustrated in FIG. 1 and FIG. 2, a sliding transport apparatus 100 of a storage portion for a vehicle according to an embodiment of the present disclosure may include: a fixed frame 110 provided such that the fixed frame 110 is stationary in a vehicle interior space; a movable frame 120 disposed on an upper portion of the fixed frame 110 and configured to be movable along a longitudinal direction of the fixed frame 110, the movable frame 120 having an upper portion on which the storage portion (not illustrated) is mounted; and a stopper 200 provided detachably on the fixed frame 110, the stopper 200 being inserted into a guide long hole 121a formed in the movable frame 120, thereby limiting a movement distance of the movable frame 120.

The fixed frame 110 is a component which is mounted inside the vehicle and has a predetermined length and a predetermined width, and may be manufactured by an extrusion method.

As illustrated in FIG. 3 and FIG. 4, the fixed frame 110 may include: a floor member 111 provided such that the floor member 111 is stationary in the vehicle interior space; and a first inclined member 112 that protrudes in a direction inclined upwardly from opposite sides in a width direction of the floor member 111, the first inclined member 112 on which a plurality of rail casters C configured to move the movable frame 120 is rotatably mounted.

The floor member 111 may be mounted between a driver seat and a passenger seat, or may be mounted at a dashboard that is disposed in the front of the vehicle's interior space.

The first inclined member 112 is provided along an entire of the longitudinal direction of the floor member 111 from end portions in the width direction of the floor member 111. The first inclined member 112 provides a space where the plurality of rail casters C is capable of being rotatably mounted. In an embodiment of the present disclosure, it is illustrated in drawings that four rail casters C are provided on the first inclined member 112.

The first inclined member 112 may be disposed such that the first inclined member 112 is inclined upwardly at an angle range of 10 degrees to 80 degrees from the end portions in the width direction of the floor member 111.

In addition, the plurality of rail casters C provided on the first inclined member 112 may be rotatably mounted on the first inclined member 112 while having an inclination angle equal to an inclination angle of the first inclined member 112. That is, as illustrated in FIG. 4, since a shaft connected to the rail caster C is mounted in an inclination direction on the first inclined member 112, a rolling contact surface of the rail caster C may be disposed in the inclination direction.

The movable frame 120 is also a component which is mounted inside the vehicle and has a predetermined length and a predetermined width, and may be manufactured by an extrusion method.

As illustrated in FIG. 3 and FIG. 5, the movable frame 120 may include: an upper plate member 121 on which the storage portion is mounted on an upper surface thereof and in which the guide long hole 121a is formed; and a second inclined member 122 that protrudes in a direction inclined upwardly from opposite sides in a width direction of the upper plate member 121 while having an inclination angle equal to the inclination angle of the first inclined member 112, the second inclined member 122 having a rail groove 122a in which the rail caster C is accommodated.

The upper plate member 121 is a component that is coupled to the storage portion, and has an area capable of supporting the storage portion.

The upper plate member 121 is configured to be rectilinearly reciprocated along the longitudinal direction of the floor member 111 while being disposed so as to face the floor member 111.

The guide long hole 121a formed in the upper plate member 121 is formed along a longitudinal direction of the upper plate member 121. In an embodiment of the present disclosure, a pair of guide long holes 121a spaced apart from each other by a predetermined distance is formed in a center portion of the upper plate member 121.

Meanwhile, the plurality of rail casters C provided on the first inclined member 112 of the fixed frame 110 is in rolling contact with any one guide protrusion 122b or 122c among a pair of guide protrusions 122b and 122c formed on the second inclined member 122.

As illustrated in FIG. 4, among the plurality of rail casters C provided on the first inclined member 112, any one rail caster C may be in rolling contact with the guide protrusion 122c provided at a lower end of the second inclined member 122, and another rail caster C disposed on a first side of the first inclined member 112 may be in rolling contact with the guide protrusion 122b provided at an upper end of the second inclined member 122.

That is, the plurality of rail casters C provided on the first inclined member 112 is alternately in rolling contact with any one of the guide protrusions 122b and 122c among the pair of guide protrusions 122b and 122c formed on the second inclined member 122.

In an embodiment of the present disclosure, the four rail casters C provided on the first inclined member 112 may be disposed such that two rail casters C are in rolling contact with the guide protrusion 122b that is positioned at the upper end of the second inclined member 122 and the remaining two rail casters C are in rolling contact with the guide protrusion 122c that is positioned at the lower end of the second inclined member 122.

As such, since the plurality of rail casters C is in selectively rolling contact with the guide protrusion 122b positioned at the upper end of the second inclined member 122 and with the guide protrusion 122c positioned at the lower end of the second inclined member 122, a rolling frictional force generated between the rail casters C and the second inclined member 122 may be reduced and, accordingly, the movable frame 120 may be rectilinearly reciprocated on the fixed frame 110 easily.

Meanwhile, the movable frame 120 may further include a guide member 123 that protrudes vertically downward from a center of a bottom portion of the upper plate member 121.

The guide member 123 serves to reinforce the rigidity of the upper plate member 121, and serves to prevent the upper plate member 121 from being moved in left and right directions when the upper plate member 121 is slidably moved. That is, as illustrated in FIG. 3, since the guide member 123 is slidably moved while being in contact with a pair of guide rollers 240 of the stopper 200 that will be described later, left and right movements of the upper plate member 121 may be prevented.

The stopper 200 is configured to limit the maximum withdrawal distance of the movable frame 120, and is also configured to prevent the left and right movements of the movable frame 120 by cooperating with the guide long holes 121a formed in the upper plate member 121 during a process in which the movable frame 120 is slidably moved in a rectilinear direction.

As illustrated in FIG. 4 and FIG. 6, the stopper 200 may include: a plate 210 mounted on the bottom surface of the floor member 111; an insertion member 220 which is integrally connected to the plate 210 and protrudes upward from an upper surface of the plate 210, the insertion member 220 being inserted into the guide long hole 121a; and a buffer member 230 having a through-hole 231 into which the insertion member 220 is capable of being inserted, the buffer member 230 surrounding a circumferential portion of the insertion member 220.

As illustrated in FIG. 7, the plate 210 may be mounted on the bottom surface of the floor member 111. At this time, the plate 210 may be mounted on the bottom surface of the floor member 111 while blocking any one of a plurality of opening portions 111a among the plurality of opening portions 111a formed such that the plurality of opening portions 111a is spaced apart from each other by a predetermined distance along the longitudinal direction of the floor member 111.

In addition, the pair of guide rollers 240 spaced apart from each other by a predetermined distance is rotatably mounted on the upper surface of the plate 210. The pair of guide rollers 240 may be manufactured from a rubber material or urethane material, and may be in rolling contact with a first side surface or a second side surface of the guide member 123 when the guide member 123 is slidably moved. The pair of guide rollers 240 is not limited to serving as guides and also serves to control an operation force of the movable frame 120.

The insertion member 220 may be inserted into the guide long hole 121a formed in the upper plate member 121. At this time, the upper end portion of the insertion member 220 is partially exposed to an upper portion of the upper plate member 121 via the guide long hole 121a.

The buffer member 230 may be manufactured from rubber material having an elastic restoring force, and the through-hole 231 into which the insertion member 220 is capable of being inserted in a forcibly fitting manner is formed in the center of the buffer member 230.

In addition, a separation prevention member 221 configured to prevent the buffer member 230 from being separated is provided on the upper end of the insertion member 220.

As described above, the stopper 200 described above serves to limit the maximum movement distance of the movable frame 120, and also serves to relieve a shock that occurs during a process in which the movable frame 120 is slidably moved and then stopped.

As illustrated in FIG. 2, when the movable frame 120 is slidably moved in a first direction on the fixed frame 110 so as to withdraw the storage portion, a second end side in a longitudinal direction of the guide long hole 121a may be in contact with a second side of the buffer member 230 of the stopper 200. Then, the sliding movement of the movable frame 120 may be limited. In addition, a moment when the buffer member 230 is in contact with the second end side in the longitudinal direction of the guide long hole 121a may be referred to as a state in which the movable frame 120 is maximally withdrawn on the fixed frame 110.

Conversely, when the movable frame 120 that is withdrawn is slidably moved in a second direction in order to return the storage portion to an original state, a first end side in the longitudinal direction of the guide long hole 121a may be in contact with a first side of the buffer member 230 of the stopper 200 as illustrated in FIG. 1. Then, a storage space of the storage portion and the movable frame 120 are not exposed to the outside.

As described above, the stopper 200 may limit the maximum movement distance of the movable frame 120, and may relieve a shock that occurs in the process. In addition, since the stopper 200 is in a state in which the stopper 200 is inserted into the guide long hole 121a, a phenomenon in which the movable frame is shaken in the left and right directions in the process of rectilinearly reciprocating the movable frame 120 may be prevented by the stopper 200. That is, even when a force in the left and right directions is generated on the movable frame 120, an inner side portion of the guide long hole 121a of the upper plate member 121 is in contact with the buffer member 230 of the stopper 200, so that the left and right movements of the movable frame 120 may be prevented.

Meanwhile, the maximum movement distance of the movable frame 120 may be set by changing the position of the stopper 200 mounted on the fixed frame 110. That is, among the plurality of opening portions 111a provided in the floor member 111, the stopper 200 may be optionally mounted on any one opening portion 111a, so that the maximum movement distance (the withdrawal distance of the storage portion) of the movable frame 120 may be set. For reference, the maximum movement distance of the movable frame 120 (the withdrawal distance of the storage portion) may be set in consideration of a volume of the storage portion, the vehicle interior space, and the mounting position of the fixed frame 110.

For example, when the stopper 200 is mounted on the opening portion 111a formed in a second end side in the longitudinal direction of the floor member 111, the maximum movement distance of the movable frame 120 becomes the shortest. Conversely, as illustrated in FIG. 2 and FIG. 7, when the stopper 200 is mounted on the opening portion 111a formed in a first end side in the longitudinal direction of the floor member 111, the maximum movement distance of the movable frame 120 may become the longest.

Although detailed exemplary embodiments according to the present disclosure have been described so far, obviously, various modifications may be made without departing from the scope of the present disclosure.

Therefore, the scope of the present disclosure should not be limited to the above embodiments, and should be determined not only by the scope of the claims to be described later, but also by the scope and equivalents of the claims.

The present disclosure may be applied and sold in the automotive industry.

The invention claimed is:

1. A sliding transport apparatus for a storage portion of a vehicle, the sliding transport apparatus comprising:
   a fixed frame provided such that the fixed frame is stationary in a vehicle interior space;
   a movable frame disposed on an upper portion of the fixed frame and configured to be movable along a longitudinal direction of the fixed frame, the movable frame having an upper portion on which the storage portion is mounted; and
   a stopper provided detachably on the fixed frame, the stopper being inserted into a guide long hole formed in the movable frame, thereby limiting a movement distance of the movable frame,
   wherein the fixed frame comprises:
   a floor member provided such that the floor member is stationary in the vehicle interior space; and
   a first inclined member that protrudes in a direction inclined upwardly from opposite sides in a width direction of the floor member, the first inclined member on which a plurality of rail casters configured to move the movable frame is rotatably mounted.

2. The sliding transport apparatus of claim 1, wherein the movable frame comprises:
   an upper plate member on which the storage portion is mounted and in which the guide long hole is formed; and
   a second inclined member that protrudes in a direction inclined upwardly from opposite sides in a width direction of the upper plate member while having an inclination angle equal to an inclination angle of the first inclined member, the second inclined member having a rail groove in which the plurality of rail casters is accommodated.

3. The sliding transport apparatus of claim 1, wherein the plurality of rail casters is rotatably mounted on the first inclined member while having an inclination angle equal to an inclination angle of the first inclined member.

4. The sliding transport apparatus of claim 1, wherein the stopper comprises:
   a plate mounted on a bottom surface of the floor member;
   an insertion member that protrudes upward from an upper surface of the plate, the insertion member being inserted into the guide long hole; and
   a buffer member having a through-hole into which the insertion member is capable of being inserted, the buffer member surrounding a circumferential portion of the insertion member.

5. The sliding transport apparatus of claim 4, wherein the movable frame comprises a guide member that protrudes vertically downward from a center of a bottom portion of the upper plate member, and a guide roller in rolling contact with the guide member is rotatably provided on the plate of the stopper with the guide member interposed therebetween.

6. The sliding transport apparatus of claim 5, wherein a plurality of opening portions disposed so as to be spaced apart from each other by a predetermined distance is formed in the floor member along a longitudinal direction of the floor member, and the plate of the stopper is provided on the floor member while blocking any one of the plurality of opening portions among the plurality of opening portions.

* * * * *